(12) United States Patent
Rathinasamy et al.

(10) Patent No.: US 12,488,153 B2
(45) Date of Patent: Dec. 2, 2025

(54) NETWORKING DEVICE SECURITY SYSTEM

(71) Applicant: Dell Products L.P., Round Rock, TX (US)

(72) Inventors: Shree Rathinasamy, Round Rock, TX (US); Victor Teeter, Round Rock, TX (US); Vikram Mandayam Bhoolokam, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 18/467,951

(22) Filed: Sep. 15, 2023

(65) Prior Publication Data

US 2025/0094651 A1 Mar. 20, 2025

(51) Int. Cl.
*G06F 21/88* (2013.01)

(52) U.S. Cl.
CPC .................... *G06F 21/88* (2013.01)

(58) Field of Classification Search
CPC .......... G06F 21/86; G06F 21/88; G06F 21/44; G06F 21/45; G06F 21/55; G06F 21/554; G06F 1/181; H05K 1/1491; H04L 41/0816
See application file for complete search history.

(56) References Cited

U.S. PATENT DOCUMENTS

| | | | | |
|---|---|---|---|---|
| 6,756,704 B2 * | 6/2004 | Milojicic | ........... | G08B 13/1418 340/572.9 |
| 10,909,240 B2 * | 2/2021 | Eltoft | .................... | G06F 21/554 |
| 11,325,763 B2 * | 5/2022 | Tsang | ..................... | G08B 13/02 |
| 11,514,196 B2 * | 11/2022 | Grobelny | .............. | H04L 9/0891 |
| 11,886,232 B2 * | 1/2024 | Mahaffey | .............. | H04W 12/02 |
| 11,924,206 B2 * | 3/2024 | Yew | .................... | H04L 63/0236 |
| 12,041,445 B2 * | 7/2024 | Finger | .................... | H04W 8/04 |

OTHER PUBLICATIONS

Rohit Kumar, "OCP NIC 3.0 Form Factors The Quick Guide," May 2, 2022, 12 pages, Serve TheHome, retrieved from the Internet, https://www.servethehome.com/ocp-nic-3-0-form-factors-quick-guide-intel-broadcom-nvidia-meta-inspur-dell-emc-hpe-lenovo-gigabyte-supermicro/.

* cited by examiner

*Primary Examiner* — Hosuk Song
(74) *Attorney, Agent, or Firm* — Joseph Mencher

(57) ABSTRACT

A networking device security system includes a chassis housing a networking device. A locking element is movably coupled to the chassis adjacent the networking device, and an actuator device in the chassis is configured to actuate the locking element. A networking device security subsystem in the chassis receives a networking device locking command via a network, verifies the networking device locking command and, in response, controls the actuator device to actuate the locking element into a locked orientation that prevents movement of the networking device relative to the chassis. Subsequently, the networking device security subsystem receives a networking device unlocking command via the network, verifies the networking device unlocking command and, in response, controls the actuator device to actuate the locking element into an unlocked orientation that does not prevent movement of the networking device relative to the chassis.

20 Claims, 13 Drawing Sheets

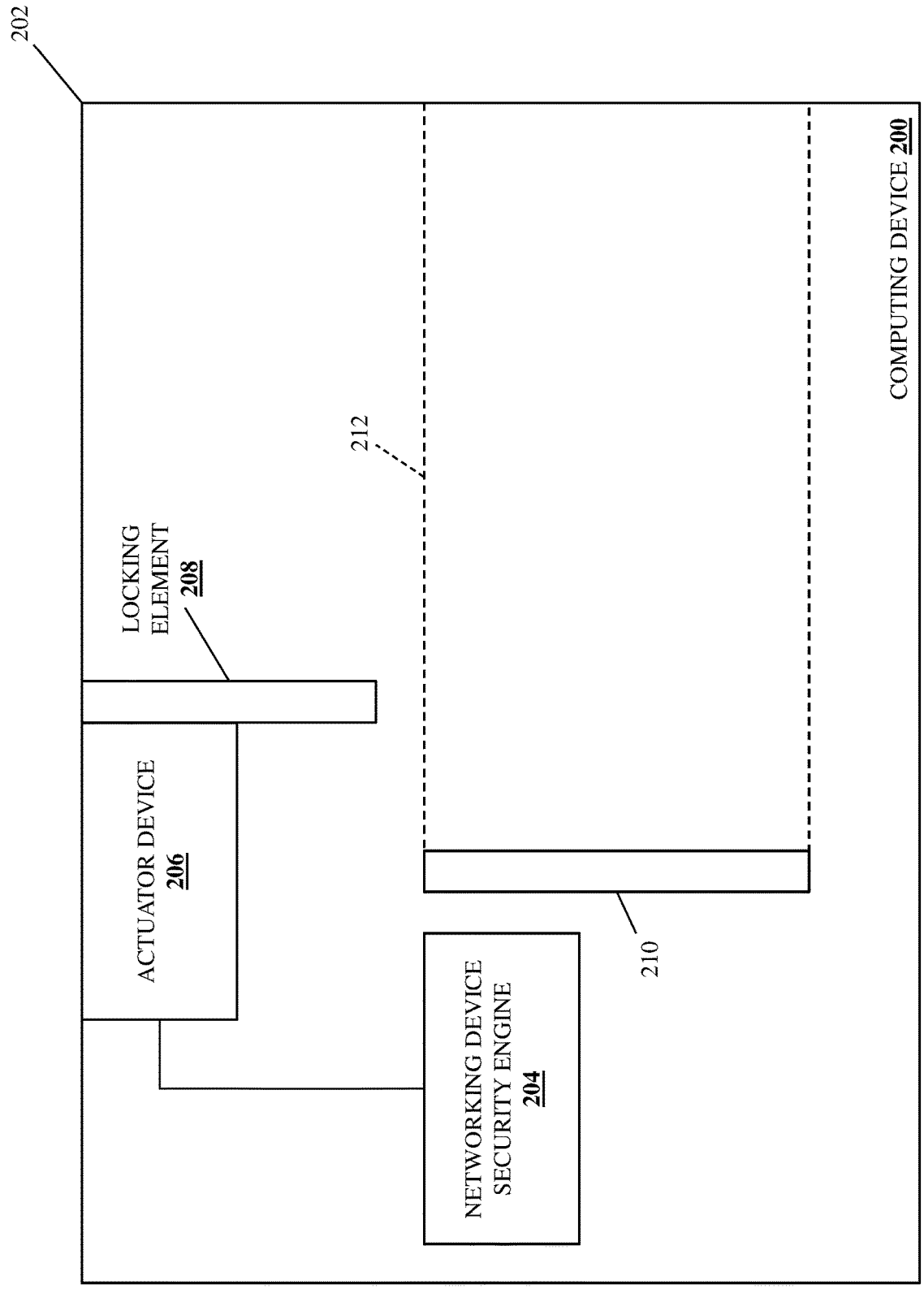

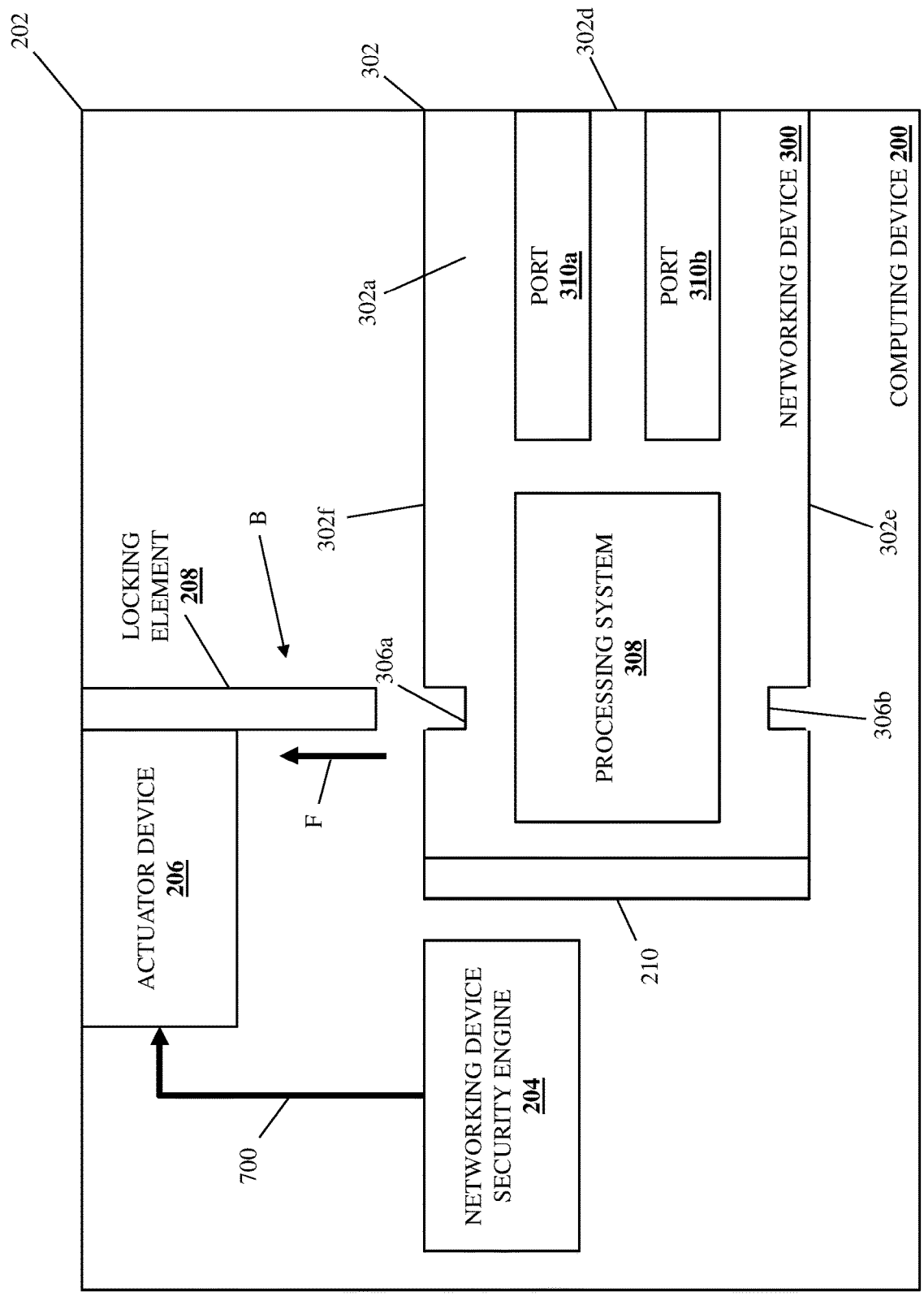

NETWORKING DEVICE SECURITY SYSTEM

BACKGROUND

The present disclosure relates generally to information handling systems, and more particularly to providing security for networking devices in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, often include networking devices for use in transmitting and receiving communications via a network. Furthermore, some computing devices may utilize Open Compute Project (OCP) Network Interface Controller (NIC) networking devices such as those provided according to the OCP NIC 3.0 specification, which one of skill in the art in possession of the present disclosure will appreciate may be configured to be accessible via an outer surface of the computing device to which they are connected.

For example, many OCP NIC networking devices are configured to be inserted into an OCP NIC networking device housing defined by a chassis of a computing device from an outer surface on the chassis and via an OCP NIC entrance defined by that outer surface in order to engage an OCP NIC connector housed in the chassis adjacent the OCP NIC networking device housing, as well as configured to be disconnected from the OCP NIC connector and removed from OCP NIC networking device housing from the outer surface of the chassis of the computing device by grasping the OCP NIC networking device and pulling it out of the OCP NIC networking device housing. As will be appreciated by one of skill in the art in possession of the present disclosure, OCP NIC networking devices like those described above provide benefits over conventional NIC devices that are used to provide network connectivity for computing devices and that require the powering off of their computing device and opening up the chassis of their computing device to gain access to the chassis housing in order to connect those conventional NIC devices to, or disconnect the conventional NIC device from, their computing device.

However, some computing devices may be provided in relatively unsecure locations such as, for example, telecommunications (telco) environments, the "edge" of a network, and/or other remote or public/easily accessible locations (e.g., retail stores) that are not subject to security measures like those provided in datacenter environments, which introduces the possibility of security issues such as theft, vandalism, etc. As such, the benefits of the OCP NIC networking devices discussed above that allow them to be easily accessed and disconnected from their computing devices subject them to the security issues discussed above when used with computing devices in unsecure locations. Conventional solutions to such issues include providing a manual securing latch in the chassis housing defined by the chassis of computing devices in which OCP NIC networking devices are provided, and manually latching that manual securing latch to before closing up the chassis of their computing device in order to secure the OCP NIC networking device by preventing disconnection and removal of the OCP NIC networking device from the computing device. However, such conventional solutions negate many of the benefits of the OCP NIC networking devices discussed above, as the chassis of their computing device must be opened up to gain access to the chassis housing in order to connect and secure the OCP NIC networking devices to, or unsecure and disconnect the OCP NIC networking devices from, their computing device.

Accordingly, it would be desirable to provide a networking device security system that addresses the issues discussed above.

SUMMARY

According to one embodiment, an Information Handling System (IHS) includes a chassis that defines a networking device housing; a locking element that is movably coupled to the chassis adjacent the networking device housing; an actuator device that is included in the chassis and that is configured to actuate the locking element; a processing system that is included in the chassis; and a memory system that is included in the chassis, that is coupled to the processing system, and that includes instructions that, when executed by the processing system, cause the processing system to provide a networking device security engine that is configured to: receive, via a network, a networking device locking command; verify the networking device locking command and, in response, control an actuator device to actuate the locking element into a locked orientation in which the locking element prevents movement of a networking device relative to the chassis when the networking device is located in the networking device housing; receive, via the network and subsequent to actuating the locking element into the locked orientation, a networking device unlocking command; and verify the networking device unlocking command and, in response, control the actuator device to actuate the locking element into an unlocked orientation in which the locking element does not prevent movement of a networking device relative to the chassis when the networking device is located in the networking device housing.

BRIEF DESCRIPTION OF THE DRAWINGS

FIG. 2A is a schematic top view illustrating an embodiment of a computing device that may provide the networking device security system of the present disclosure.

FIG. 7A is a schematic top view illustrating an embodiment of the networking device of FIGS. 3A and 3B being unsecured from the computing device of FIG. 2A during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
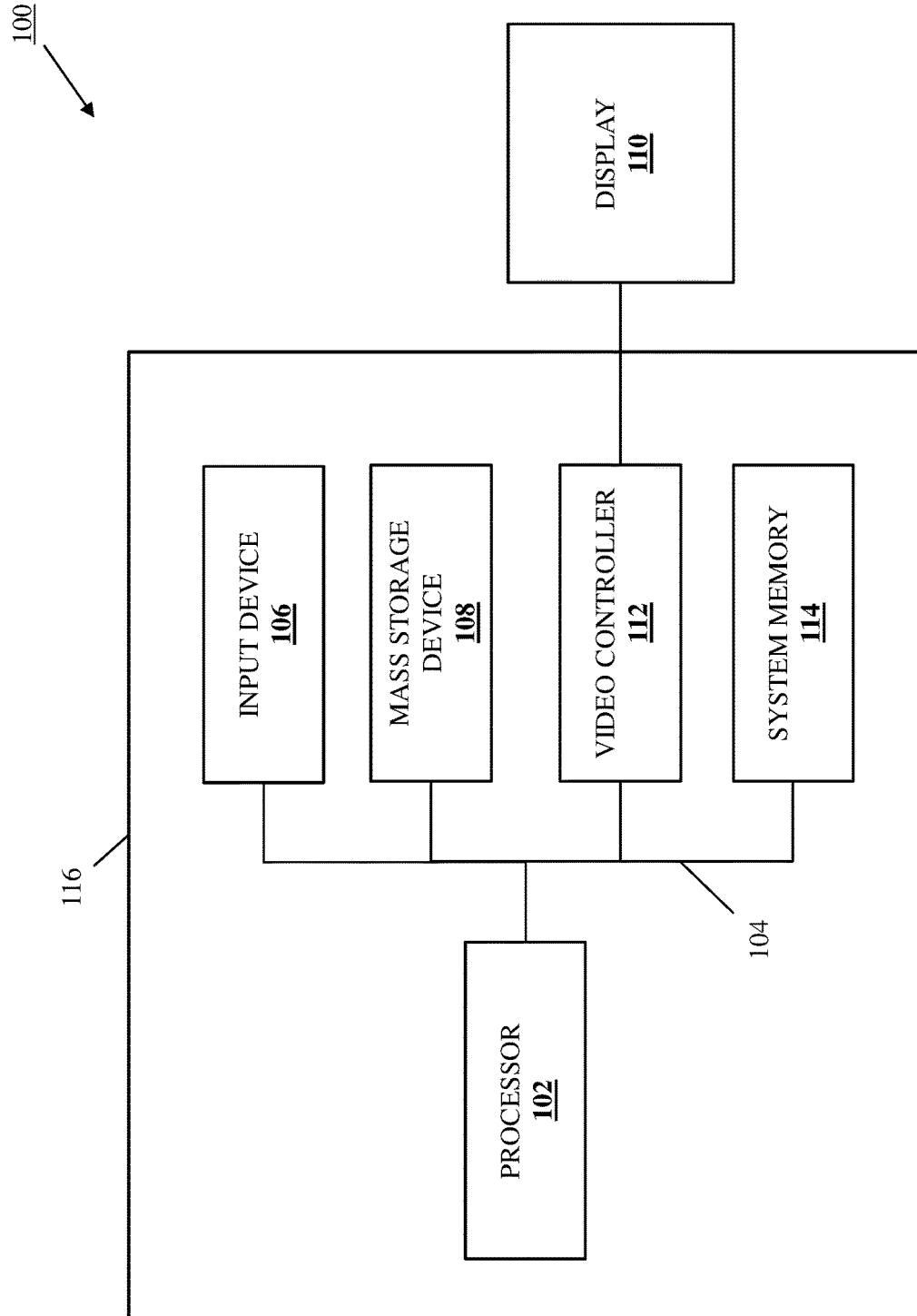
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2B:
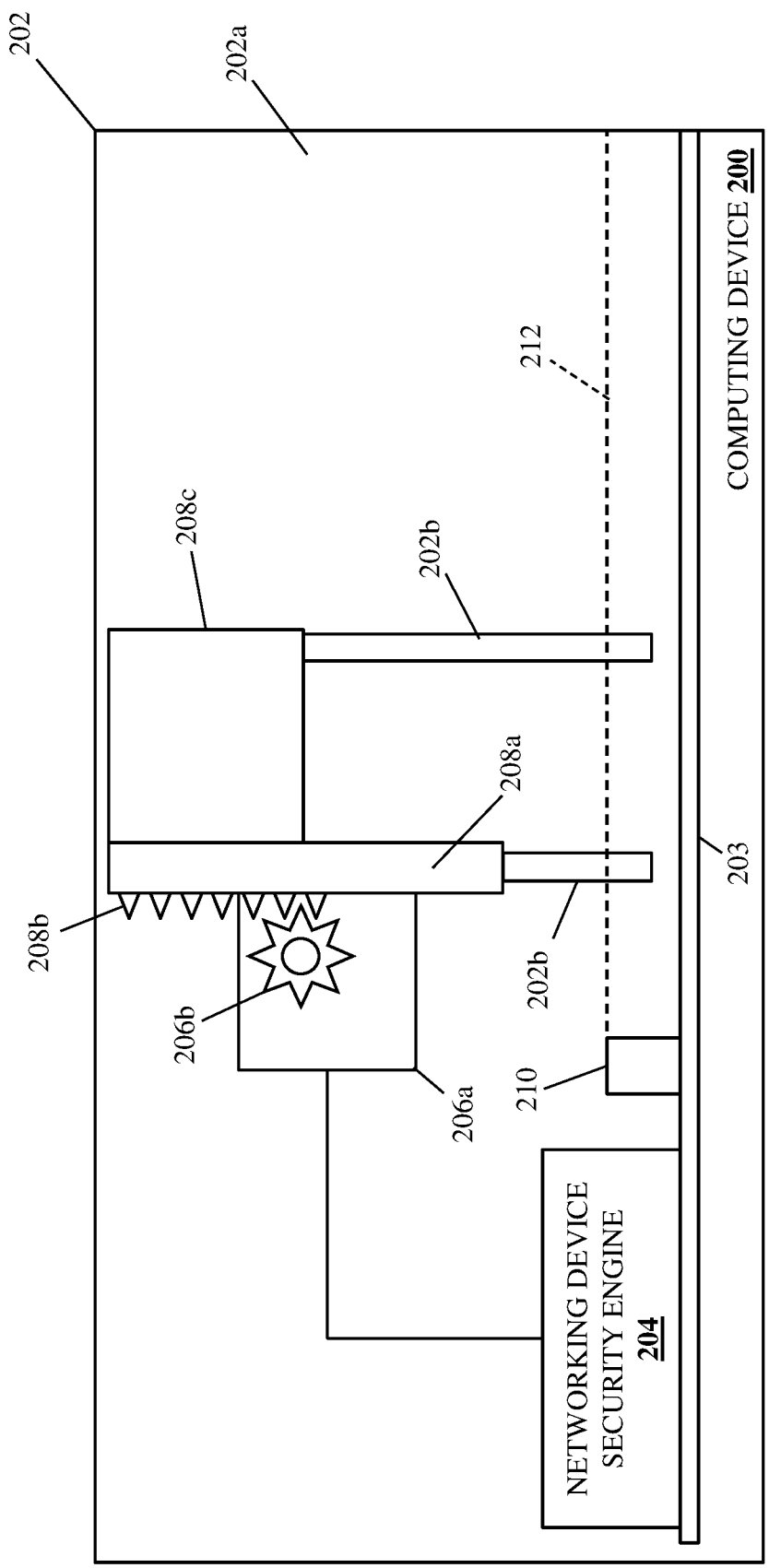
FIG. 2B is a schematic side view illustrating an embodiment of the computing device of FIG. 2A.

Referring now to FIGS. 2A and 2B, an embodiment of a computing device 200 is illustrated that may provide the networking device security system of the present disclosure. As such, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and discussed below. For example, the chassis 202 may house a circuit board 203 (visible in FIG. 2B) that supports a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking device security engine 204 that is configured to perform the functionality of the networking device security engines, networking device security subsystems, and/or computing devices discussed below.

In a specific example, the networking device security engine 204 may be provided by a Baseboard Management Controller (BMC) device such as, for example, the integrated DELL® Remote Access Controller (iDRAC) device provided in server devices available from DELL® Inc. of Round Rock, Texas, United States. As such, the chassis 202 may house a primary processing system (not illustrated, but which may include a Central Processing Unit (CPU)) and a primary memory system (not illustrated, but which may include Dynamic Random Access Memory (DRAM) devices) that is coupled to the primary processing system and that includes instructions that, when executed by the primary processing system, cause the primary processing system to provide a primary processing engine that may be configured to provide an operating system in the computing device 200, while also including a management processing system and a management memory system (e.g., in the BMC device described above) that is coupled to the management processing system and that includes instructions that, when executed by the management processing system, cause the management processing system to provide the networking device security engine 204 in the computing device 200. However, while a specific implementation of the networking device security engine 204 has been described, one of skill in the art in possession of the present disclosure will appreciate how the functionality of the networking device security engine 204 described below may be provided in a variety of manners that will fall within the scope of the present disclosure as well.

The chassis 202 may also house a networking device locking subsystem that includes an actuator device 206 that is coupled to the networking device security engine 204 (e.g., via an Inter-Integrated Circuit (I2C) coupling between actuator device 206 and the processing system, a Serial Peripheral Interface (SPI) coupling between actuator device 206 and the processing system, an I2C controller, and/or other coupling components that would be apparent to one of skill in the art in possession of the present disclosure). In the specific embodiment illustrated in FIG. 2B, the actuator device 206 includes a motor coupled to a circular gear element 206, although one of skill in the art in possession of the present disclosure will appreciate how other actuator devices will fall within the scope of the present disclosure as well.

The networking device locking subsystem housed in the chassis 202 may also include a locking element 208 that is coupled to the actuator device 206 and that is moveably coupled to the chassis 202. In the specific embodiment illustrated in FIG. 2B, the chassis 202 defines a plurality of locking element guide channels 202b that are included in the networking device locking subsystem, and the locking element 208 includes a linear gear element provided by a beam 208a having a plurality of gear teeth 208b, with the linear gear element mounted to a stabilizing member 208c that is movably coupled to the chassis 202 via the locking element guide members 202b. However, while a specific locking element 208 is illustrated and described, one of skill in the art in possession of the present disclosure will appreciate how other locking elements will fall within the scope of the present disclosure as well. For example, one of skill in the art in possession of the present disclosure will appreciate how the illustrated example in FIG. 2 provides the networking device locking subsystem on a "side" wall of the chassis 202 (e.g., on a wall of the chassis 202 that extends perpendicularly to the circuit board 203 and "bottom" wall of the chassis 202), but will recognize how the networking device locking subsystem may be provided in other locations in the chassis 202 (e.g., on the circuit board 203) while remaining within the scope of the present disclosure as well.

In the illustrated embodiment, the circuit board 203 in the chassis 202 also supports a networking device connector 210 that, in the specific examples provided below, is configured to connect to an Open Compute Project (OCP) Network Interface Controller (NIC) networking device, but one of skill in the art in possession of the present disclosure will appreciate how other networking device connectors will fall within the scope of the present disclosure as well. As illustrated in FIGS. 2A and 2B, a networking device housing 212 is defined in the chassis 202 adjacent the networking device connector 210 and the networking device locking subsystem, and in the specific examples provided below is configured to house an OCP NIC networking device, but one of skill in the art in possession of the present disclosure will appreciate how the housing of other networking devices will fall within the scope of the present disclosure as well.

Furthermore, while only a single networking device locking subsystem is illustrated and described as being provided in the chassis 212 adjacent the networking device housing 212, one of skill in the art in possession of the present disclosure will appreciate how multiple networking device locking subsystems that operate similarly to the networking device locking subsystem discussed below may be provided in the chassis 202 and coupled to the networking device security engine 204 while remaining within the scope of the present disclosure as well. To provide a specific example, a second networking device locking subsystem may be provided opposite the networking device housing 212 from the networking device locking subsystem illustrated in FIGS. 2A and 2B, and may operate similarly to (and along with) the networking device locking subsystem described below to secure a networking device positioned in the networking device housing 212.

While not illustrated or described in detail, one of skill in the art in possession of the present disclosure will appreciate how the chassis 202 may define a networking device entrance/exit adjacent the networking device housing 212 that is configured to allow a networking device to be inserted into the chassis 202 from outside of the chassis 202 and into the networking device housing 212 to engage the networking device connector 210. Furthermore, the chassis 212 may also include an access wall that is configured to be secured to the chassis 202 (e.g., via screws, locking elements, etc.) to restrict access to the networking device housing 212 and/or other components housed in the chassis 202. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the networking device security functionality discussed below, while remaining within the scope of the present disclosure as well.

Figure 3A:
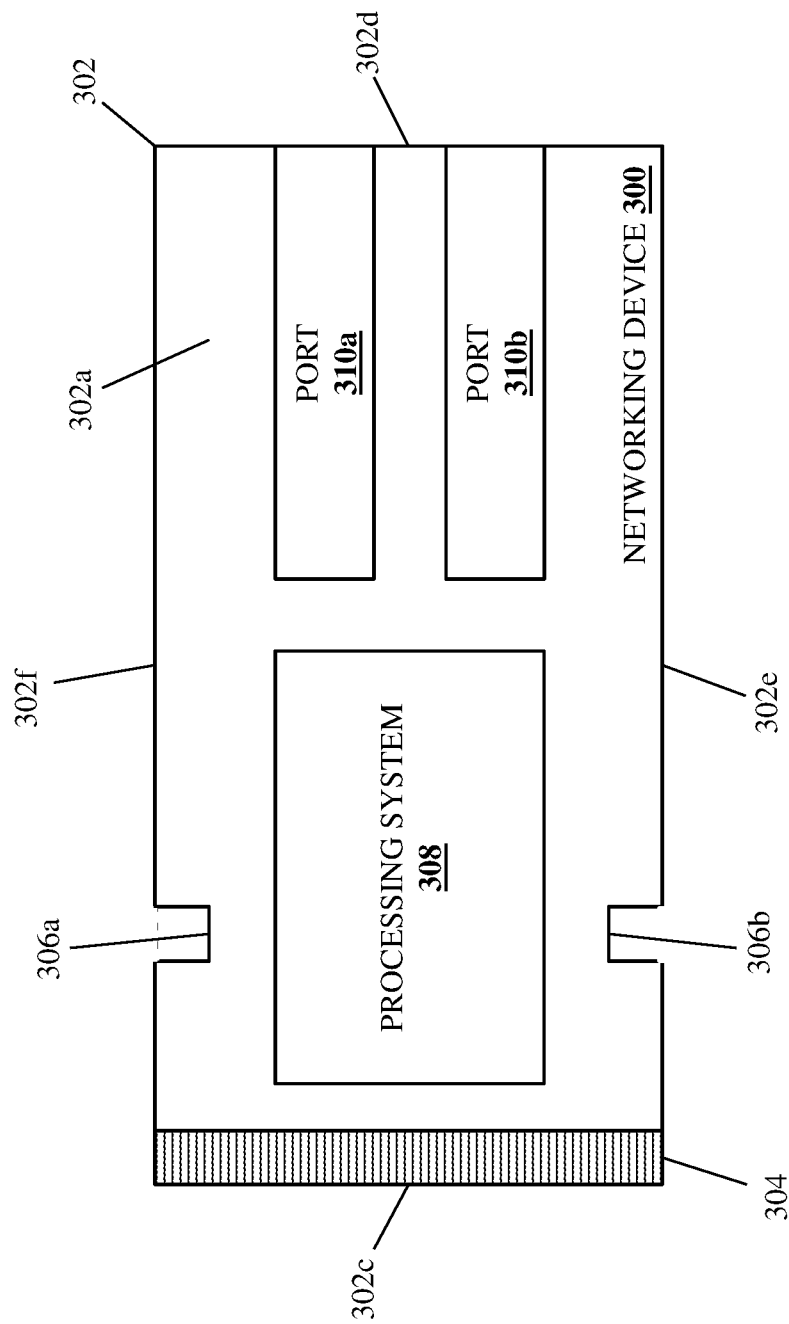
FIG. 3A is a schematic top view illustrating an embodiment of a networking device that may be provided in the computing device of FIGS. 2A and 2B and used with the networking device security system of the present disclosure.
Figure 3B:
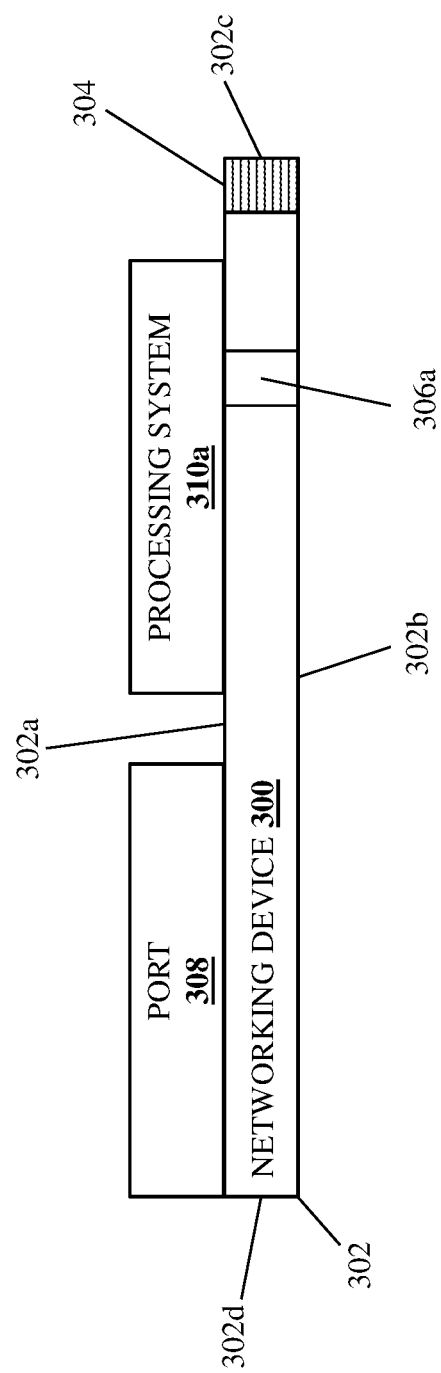
FIG. 3B is a schematic side view illustrating an embodiment of the networking device of FIG. 3A.

Referring now to FIGS. 3A and 3B, an embodiment of a networking device 300 is illustrated that may be used in the networking device security system of the present disclosure. As such, the networking device 300 may be provided as a component in the IHS 100 discussed above with reference to FIG. 1, and in specific examples may be provided by an OCP NIC networking device. However, while illustrated and discussed as being provided by an OCP NIC networking device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that may include a circuit board and/or other structural elements that support the components of the networking device 300, only some of which are illustrated and discussed below. For example, the chassis 302 may include a top surface 302a, a bottom surface 302b that is located opposite the chassis 302 from the top surface 302a, a front surface 302c that extends between the top surface 302a and the bottom surface 302b, a rear surface 302d that is located opposite the chassis 302 from the front surface 302c and that extends between the top surface 302a and the bottom surface 302b, and a pair of side surfaces 302e and 302f that are located opposite the chassis 302 from each other and that extend between the top surface 302a, the bottom surface 302b, the front surface 302c, and the rear surface 302d.

As illustrated, a connector 304 (e.g., a circuit board connector) may be included on the chassis 302 adjacent the front surface 302c of the chassis 302. Furthermore, a pair of securing notches 306a and 306b are defined by the chassis 302, extend into the chassis 302 from respective side surfaces 302e and 302f, and are located opposite the chassis 302 from each other. A processing system 308 is mounted to the top surface 302 of the chassis 302, and while not illustrated or described below, one of skill in the art in possession of the present disclosure will appreciate how the processing system 308 may be coupled to the connector 304 (e.g., via traces in the circuit board included in the chassis 302) and may include a heat sink or other heat dissipation device(s) while remaining within the scope of the present disclosure as well. A pair of ports 310a and 310b (e.g., transceiver device ports) are mounted to the top surface 302a of the chassis 302, and one of skill in the art in possession of the present disclosure will appreciate how the ports 310a and 310b may be coupled to processing system 308 and/or the connector 304 (e.g., via traces in the circuit board that is included in the chassis 302).

However, while a specific networking device 300 has been illustrated and described, one of skill in the art in possession of the present disclosure will recognize that networking devices (or other devices operating according to the teachings of the present disclosure in a manner similar to that described below for the networking device 200) may include a variety of components and/or component configurations for providing conventional networking device functionality, as well as the networking device security functionality discussed below, while remaining within the scope of the present disclosure as well. For example, one of skill in the art in possession of the present disclosure will appreciate how the OCP NIC networking device discussed above may include securing screws that are configured to secure to an outer surface of the chassis 202 to secure the OCP NIC networking device to the chassis 202, pull tabs that are accessible via the outer surface of the chassis 202 to remove the OCP NIC networking device from the chassis 202, ejector latches that are accessible via the outer surface of the chassis 202 to remove the OCP NIC networking device from the chassis 202, a push/push connection/ejection subsystem that operates with a corresponding push/push connection ejection subsystem on the chassis 202 to connect the OCP NIC networking device to, and allow the OCP NIC networking device to be removed from the chassis 202, as well as any other feature that would be apparent to one of skill in the art in possession of the present disclosure.

Figure 4:
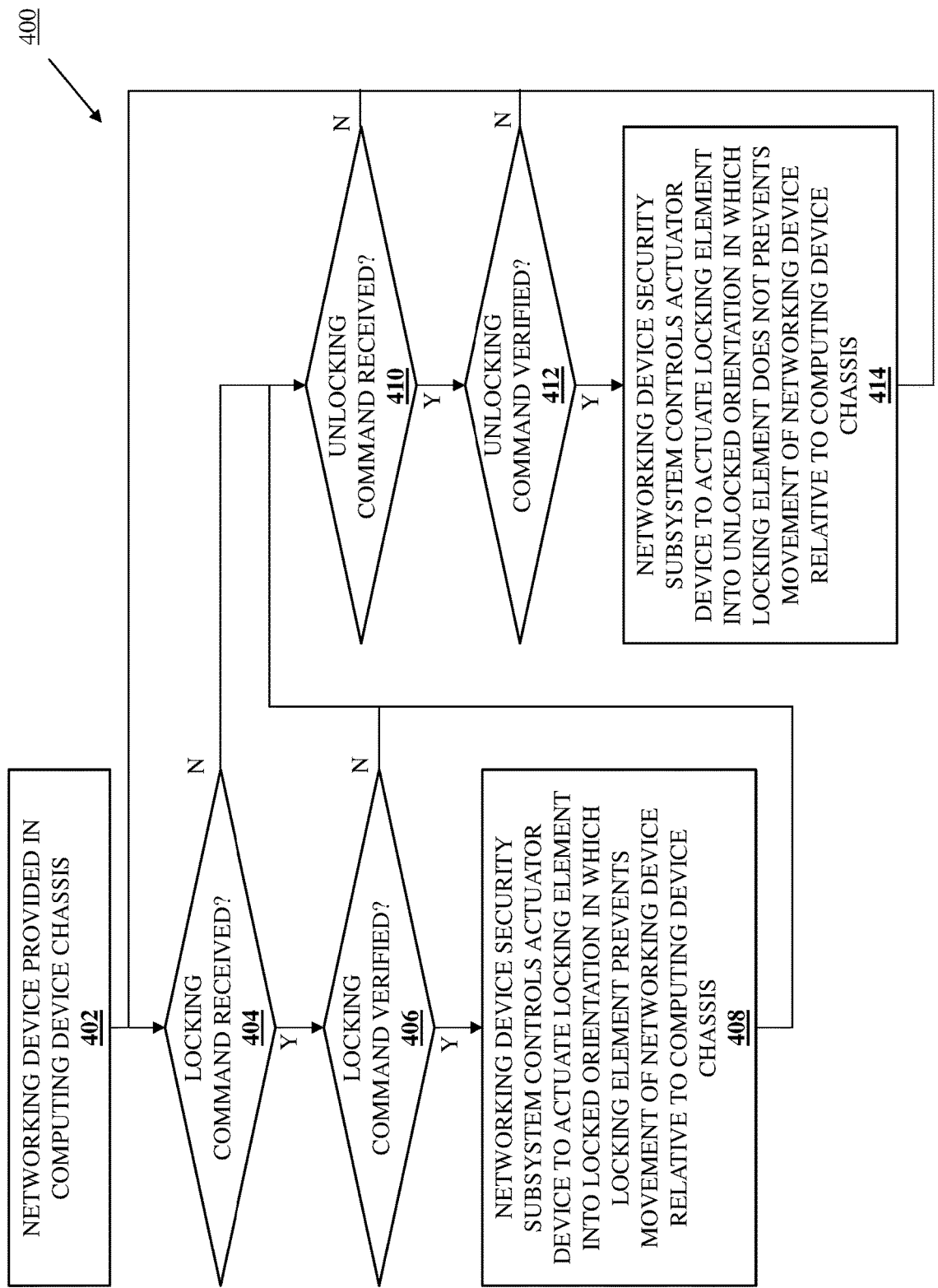
FIG. 4 is a flow chart illustrating an embodiment of a method for securing a networking device in a computing device.

Referring now to FIG. 4, an embodiment of a method 400 for securing a networking device in a computing device is illustrated. As discussed below, the systems and methods of the present disclosure provide for the securing and un-securing of a networking device in a computing device housing defined by computing device chassis without the need to physically access that computing device housing. For example, the networking device security system of the present disclosure may include a chassis housing a networking device. A locking element is movably coupled to the chassis adjacent the networking device, and an actuator device in the chassis is configured to actuate the locking element. A networking device security subsystem in the chassis receives a networking device locking command via a network, verifies the networking device locking command and, in response, controls the actuator device to actuate the locking element into a locked orientation that prevents movement of the networking device relative to the chassis. Subsequently, the networking device security subsystem receives a networking device unlocking command via the network, verifies the networking device unlocking command and, in response, controls the actuator device to actuate the locking element into an unlocked orientation that does not prevent movement of the networking device relative to the chassis. As such, networking devices like the OCP NIC networking device described herein may be connected to and disconnected from computing devices in a secure manner without the need to "open" up a computing device chassis on the computing device.

Figure 5A:
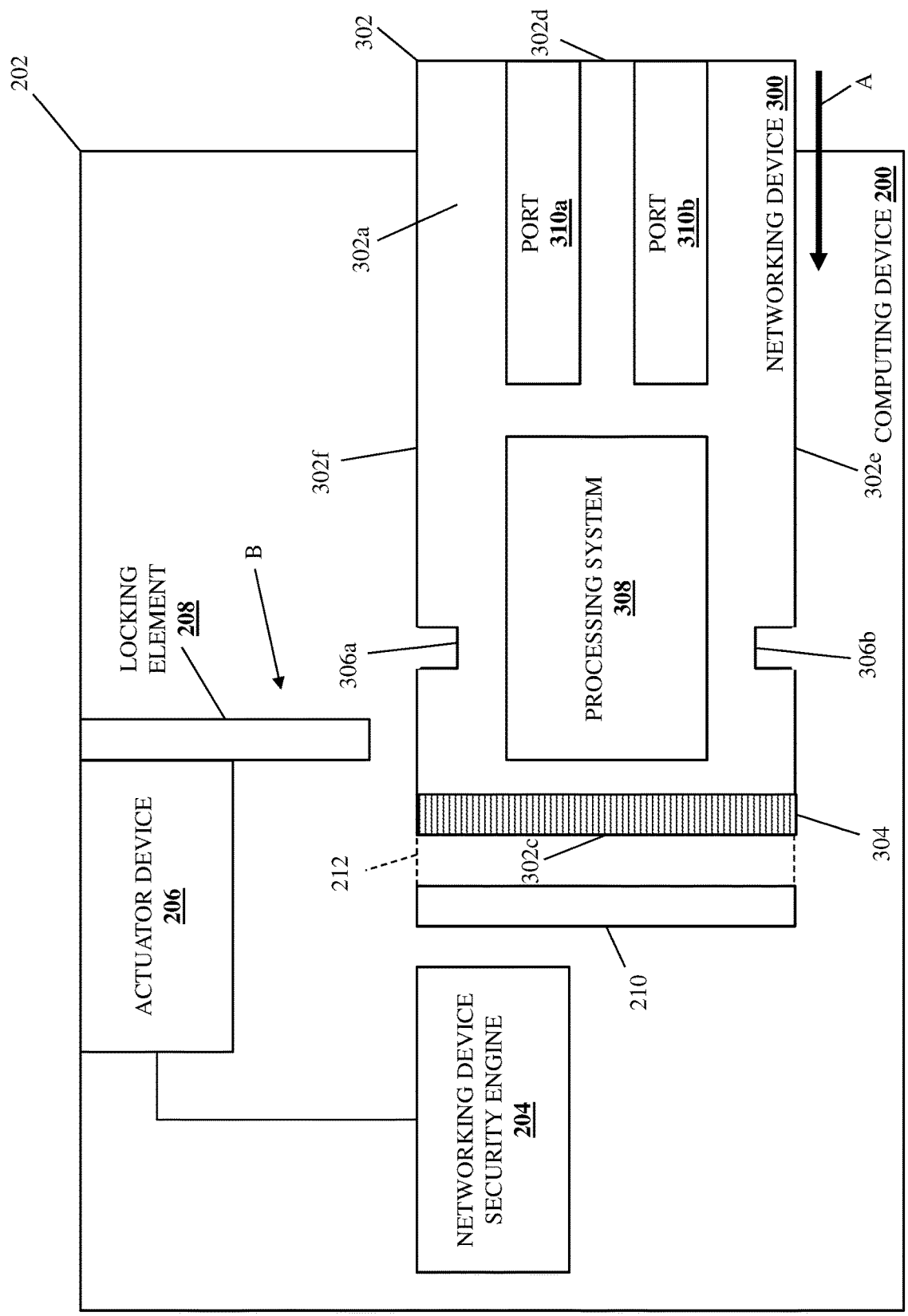
FIG. 5A is a schematic top view illustrating an embodiment of the networking device of FIGS. 3A and 3B being provided in the computing device of FIG. 2A during the method of FIG. 4.
Figure 5B:
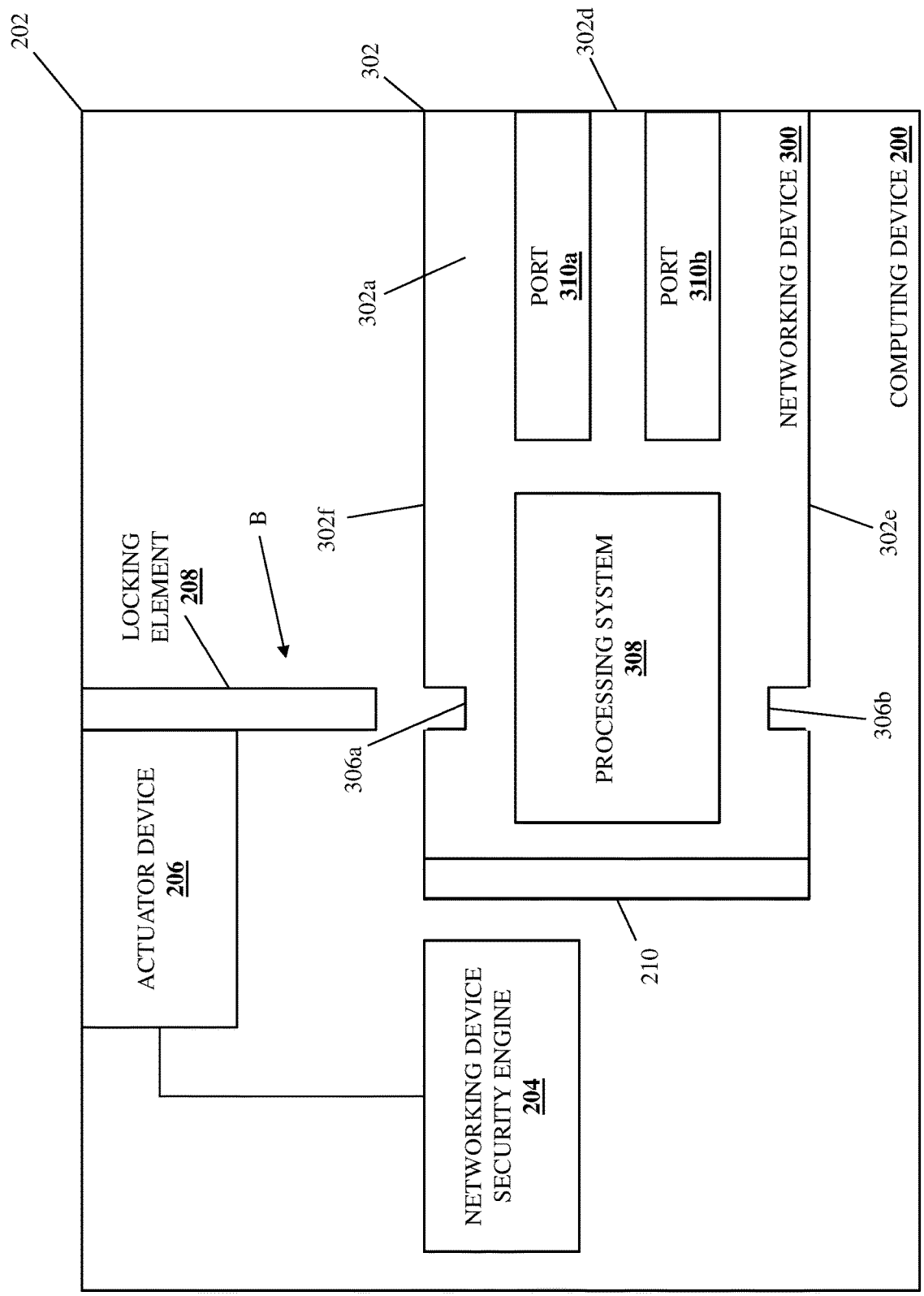
FIG. 5B is a schematic top view illustrating an embodiment of the networking device of FIGS. 3A and 3B provided in the computing device of FIG. 2A during the method of FIG. 4.
Figure 5C:
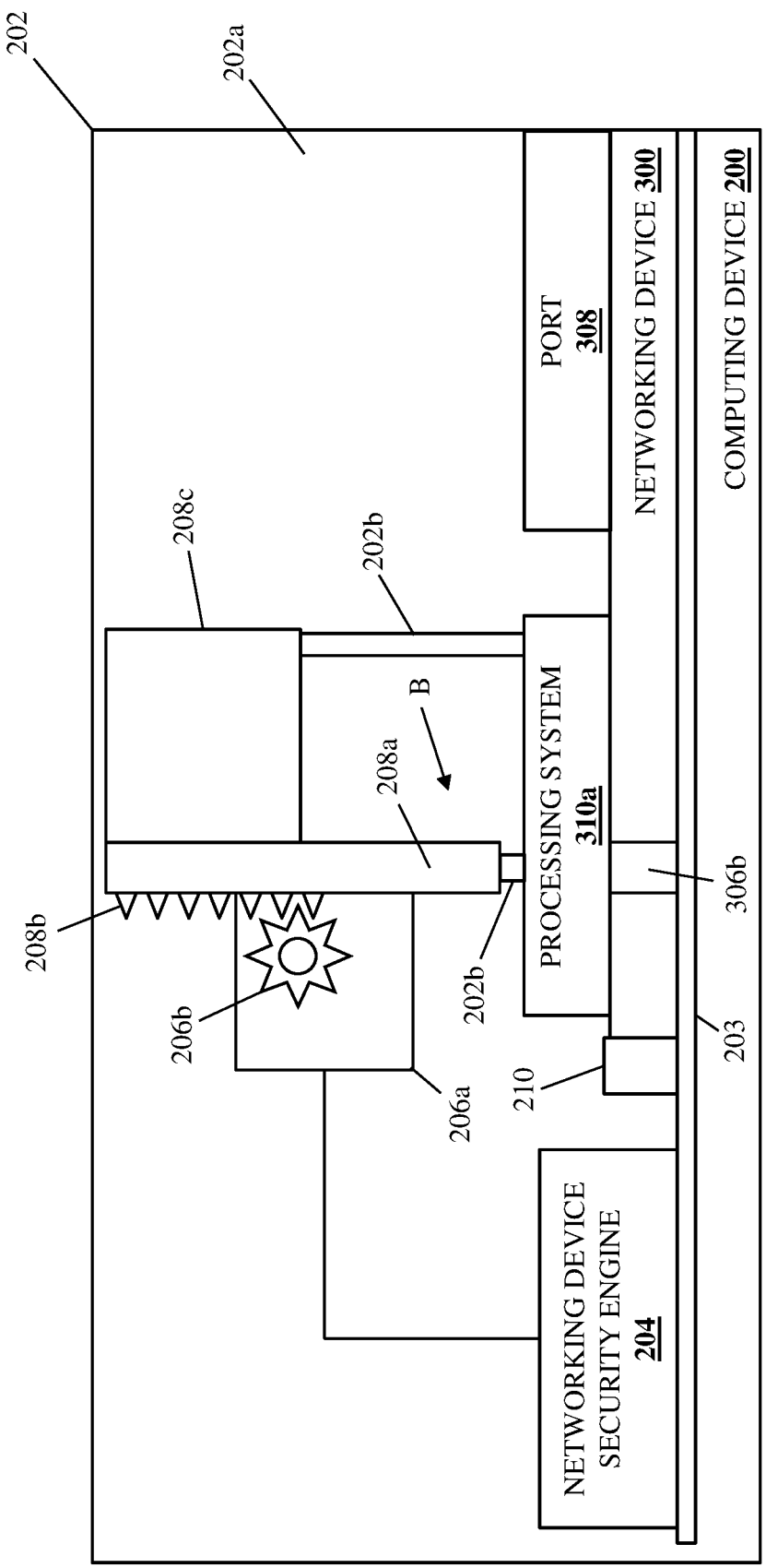
FIG. 5C is a schematic side view illustrating an embodiment of the networking device of FIGS. 3A and 3B provided in the computing device of FIG. 2B during the method of FIG. 4.

The method 400 begins at block 402 where a networking device is provided in a computing device chassis. With reference to FIG. 5A, in an embodiment of block 402, the networking device 300 discussed above with reference to FIGS. 3A and 3B may be positioned adjacent the computing device 200 discussed above with reference to FIGS. 2A and 2B such that the connector 304 and front surface 302c of the base 302 on the networking device 300 are located adjacent the networking device housing 212 defined by the chassis 202 (e.g., the networking device 300 is located outside of the computing device 200 and adjacent the networking device entrance/exit defined by the chassis 202 adjacent the networking device housing 212 discussed above), and then may be moved in a direction A such that the networking device 300 enters the networking device housing 212. With reference to FIGS. 5B and 5C, continued movement of the networking device 300 in the direction A will cause the connector 304 on the networking device 300 to engage the networking device connector 210 in the computing device 200. As will be appreciated by one of skill in the art in possession of the present disclosure, at block 402 the locking element 208 (e.g., the beam 208a on the locking element illustrated in FIG. 5C) is provided in an "unlocked" orientation B with the locking element 208 (e.g., the beam 208a on the locking element illustrated in FIG. 5C) spaced apart from the networking device housing 212 in order to allow the networking device 300 to be moved into the networking device housing 212, connected to the networking device connector 210, and/or otherwise provided in the computing device 200 as described above.

The method 400 then proceeds to decision block 404 where the method 400 proceeds depending on whether a locking command is received. As discussed below, the networking device security engine 204 is configured to receive locking commands via a network in order to provide the networking device security functionality described herein, and thus at decision block 404 the networking device security engine 204 may monitor for such locking commands. To provide a specific example, the networking device security engine 304 may be provided by a management subsystem in the computing device 200 such as the BMC device described above, and may monitor a management network at decision block 404 to determine whether a network administrator or other user of the computing device 200 and/or networking device 300 has provided such a locking command.

As such, in some embodiments, the network administrator or other user of the computing device 200 and/or networking device 300 may include a management device (e.g., a desktop computing device, a laptop computing device, a tablet computing device, a mobile phone, and/or other management devices that one of skill in the art in possession of the present disclosure would recognize as being capable of providing the locking commands described herein) that is configured (e.g., via a networking device security application installed on that management device) to generate and transmit the locking command, allowing the user to provide the locking command from a remote location, at the location of the computing device 200, and/or in any of a variety of manners that would be apparent to one of skill in the art in possession of the present disclosure. For example, a datacenter technician at the location of the computing device 200 may request that the network administrator or other user generate and transmit the locking command, the network administrator or other user (which may also be a datacenter technician) at the location of the computing device 200 may use their management device to generate and transmit the locking command, etc. However, while several specific examples have been provided, one of skill in the art in possession of the present disclosure will appreciate how the locking commands of the present disclosure may be generated, transmitted, and identified at decision block 404 in a variety of manners that will fall within the scope of the present disclosure as well.

If, at decision block 404, a locking command is received, the method 400 proceeds to decision block 406 where the method 400 proceeds depending on whether the locking command is verified. In an embodiment, at decision block 406 and in response to receiving a locking command at decision block 406, the networking device security engine 204 may perform verification operations to attempt to verify that locking command. In one example, the network administrator or other user of the management device that generated and transmitted the locking command as described above may be required to perform authentication operations in order to access a management network (e.g., log in to the management network using a username and password) over which the locking command is transmitted to the networking device security engine 204, and thus the receiving of the locking command via that management network may provide the verification operations at decision block 406 that verify that locking command (i.e., as only authenticated user can provide locking commands via that management network).

However, in other examples, the locking command may be signed with a private key (e.g., a private key accessible to the application in the management device that generated and transmitted the locking command), and the networking device security engine 204 may have access to a public key that may be used at decision block 406 to verify whether the locking command was signed using an authorized private key. However, while a few specific examples have been provided, one of skill in the art in possession of the present disclosure will appreciate how any of a variety of verification techniques may be utilized (e.g., X.509 certificates, etc.) to verify the locking command received at decision block 404. As will be appreciated by one of skill in the art in possession of the present disclosure, in the event a locking command cannot be verified, that locking command may be ignored and the method 400 may proceed as described below.

Figure 6A:
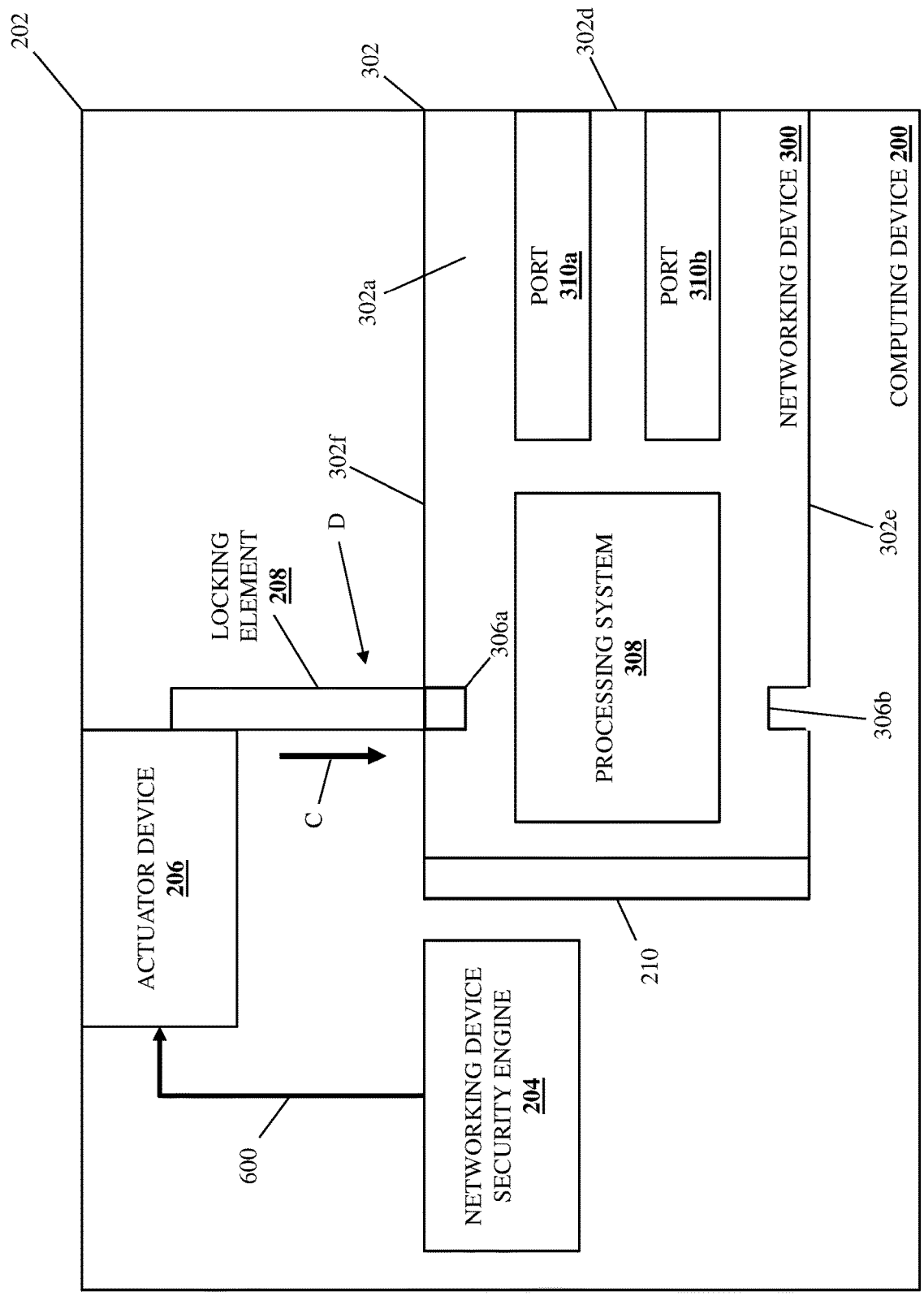
FIG. 6A is a schematic top view illustrating an embodiment of the networking device of FIGS. 3A and 3B being secured in the computing device of FIG. 2A during the method of FIG. 4.
Figure 6B:
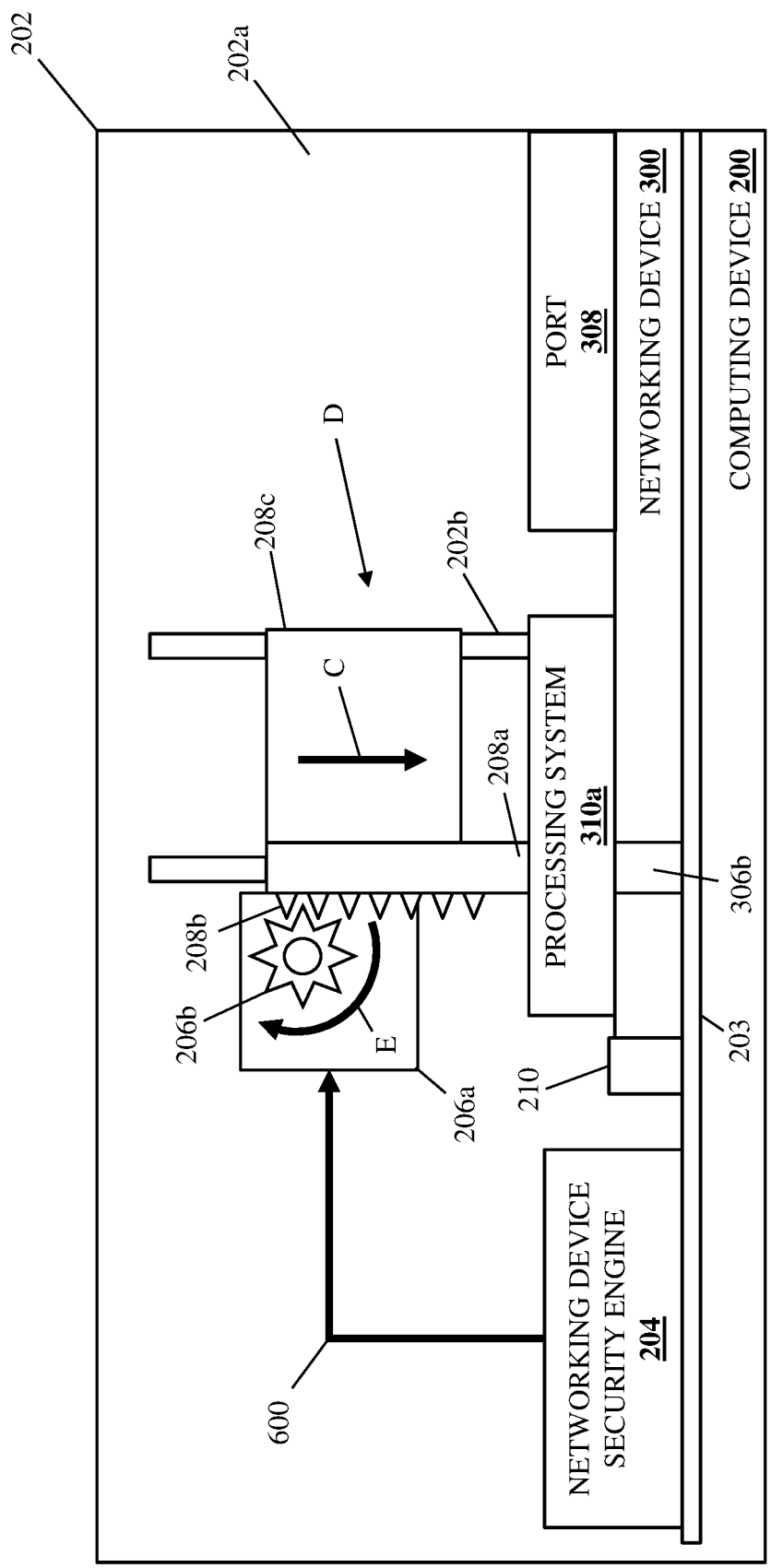
FIG. 6B is a schematic side view illustrating an embodiment of the networking device of FIGS. 3A and 3B being secured in the computing device of FIG. 2B during the method of FIG. 4.

If, at decision block 406, the locking command is verified, the method 400 proceeds to block 408 where a networking device security subsystem controls an actuator device to actuate a locking element into a locked orientation in which the locking element prevents movement of the networking device relative to the computing device chassis. With reference to FIGS. 6A and 6B, in an embodiment of block 408 and in response to verifying the locking command at decision block 406, the networking device security engine 204 may perform locking control operations 600 that may include generating and transmitting a locking instruction to the actuator device 206 that causes the actuator device 206 to actuate the locking element 208 to move the locking element 208 in a direction C and from the unlocked orientation B into a locked orientation D in which the locking element 208 enters the security notch 306a defined by the chassis 302 of the networking device 300.

As can be seen in the specific example provided in FIG. 6B, the locking control operations 600 may cause the motor 206a to rotate the circular gear element 206b in a direction E, and the engagement of the circular gear element 206b with the gear teeth 208b on the beam 208a of the linear gear element will cause the movement of the beam 208a in the direction C and into the locked orientation D, and one of skill in the art in possession of the present disclosure will appreciate how the stabilizing member 208c on the linear gear element that is mounted to the locking element guide members 202b defined by the chassis 202 operates to stabilize the movement of the beam 208a in the direction C and into the locked orientation D.

As will be appreciated by one of skill in the art in possession of the present disclosure, the positioning of the locking element 208/beam 208a in the locked orientation D and in the security notch 306a defined by the chassis 302 of the networking device 300 will operate to prevent movement of the networking device 300 relative to the chassis 202, as the chassis 302 of the networking device 300 is constrained between the networking device connector 210 and the locking element 208/beam 208a. As such, any attempt to remove the networking device 300 from the networking device housing 212/chassis 202/computing device 200 will cause the locking element 208/beam 208a to engage the chassis 302 of the networking device 302 adjacent the security notch 306a, and will prevent such removal (i.e., by resisting such removal up to the strength of the chassis 202 and/or 302).

As discussed above, while not described in detail herein, a second networking device locking subsystem (e.g., provided by an actuator device similar to the actuator device 206, a locking element similar to the locking element 208, etc.) may be provided opposite the networking device locking subsystem described above (e.g., the actuator device 206, the locking element 208, etc.), and may be controlled at block 408 to move its respective locking element/beam (e.g., provided by a locking element/beam similar to the locking element 208/beam 208a) into the security notch 306b defined by the chassis 302 of the networking device 300, which one of skill in the art in possession of the present disclosure will appreciate may operate to further prevent movement of the networking device 300 relative to the chassis 202 similarly as described above.

If at decision block 404 a locking command is not received, or if at decision block 406 the locking command is not verified, or following block 408, the method 400 proceeds to decision block 410 where the method 400 proceeds depending on whether an unlocking command is received. As discussed below, the networking device security engine 204 is configured to receive unlocking commands via a network in order to provide the networking device security functionality described herein, and thus at decision block 410 the networking device security engine 204 may monitor for such locking commands. Similarly as described above, the networking device security engine 304 may be provided by a management subsystem in the computing device 200 such as the BMC device described above, and may monitor a management network at decision block 404 to determine whether a network administrator or other user of the computing device 200 and/or networking device 300 has provided such an unlocking command.

Similarly as described above, in some embodiments, the network administrator or other user of the computing device 200 and/or networking device 300 may include a management device (e.g., a desktop computing device, a laptop computing device, a tablet computing device, a mobile phone, and/or other management devices that one of skill in the art in possession of the present disclosure would recognize as being capable of providing the locking commands described herein) that is configured (e.g., via a networking device security application installed on that management device) to generate and transmit the unlocking command, allowing the user to provide the unlocking command from a remote location, at the location of the computing device 200, and/or in any of a variety of manners that would be apparent to one of skill in the art in possession of the present disclosure. For example, a datacenter technician at the location of the computing device 200 may request that the network administrator or other user generate and transmit the unlocking command, the network administrator or other user (which may also be a datacenter technician) at the location of the computing device 200 may use their management device to generate and transmit the unlocking command, etc. However, while several specific examples have been provided, one of skill in the art in possession of the present disclosure will appreciate how the unlocking commands of the present disclosure may be generated, transmitted, and identified at decision block 410 in a variety of manners that will fall within the scope of the present disclosure as well.

If, at decision block 410, an unlocking command is received, the method 400 proceeds to decision block 412 where the method 400 proceeds depending on whether the unlocking command is verified. In an embodiment, at decision block 412 and in response to receiving an unlocking command at decision block 410, the networking device security engine 204 may perform verification operations to attempt to verify that unlocking command. Similarly as described above, the network administrator or other user of the management device that generated and transmitted the unlocking command as described above may be required to perform authentication operations in order to access a management network (e.g., log in to the management network using a username and password) over which the unlocking command is transmitted to the networking device security engine 204, and thus the receiving of the unlocking command via that management network may provide the verification operations at decision block 412 that verify that unlocking command (i.e., as only authenticated user can provide unlocking commands via that management network).

However, in other examples, the unlocking command may be signed with a private key (e.g., a private key accessible to the application in the management device that generated and transmitted the unlocking command), and the networking device security engine 204 may have access to a public key that may be used at decision block 406 to verify whether the unlocking command was signed using an authorized private key. However, while a few specific examples have been provided, one of skill in the art in possession of the present disclosure will appreciate how any of a variety of verification techniques may be utilized (e.g., X.509 certificates, etc.) to verify the unlocking command received at decision block 410. As will be appreciated by one of skill in the art in possession of the present disclosure, in the event a unlocking command cannot be verified, that unlocking command may be ignored and the method 400 may proceed as described below.

Figure 7B:
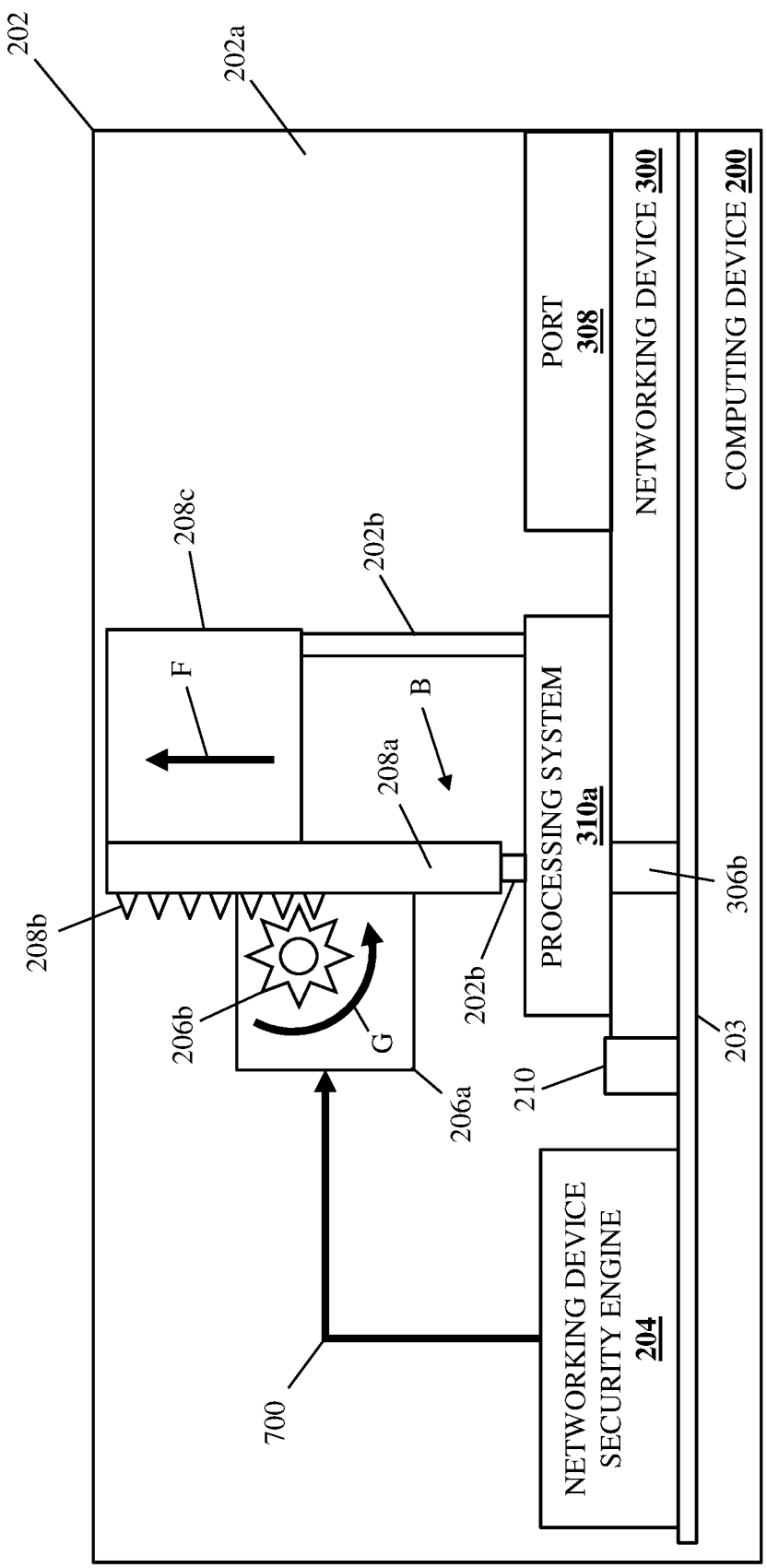
FIG. 7B is a schematic side view illustrating an embodiment of the networking device of FIGS. 3A and 3B being unsecured from the computing device of FIG. 2B during the method of FIG. 4.

If, at decision block 412, the unlocking command is verified, the method 400 proceeds to block 414 where the networking device security subsystem controls the actuator device to actuate the locking element into an unlocked orientation in which the locking element does not prevent movement of the networking device relative to the computing device chassis. With reference to FIGS. 7A and 7B, in an embodiment of block 414 and in response to verifying the locking command at decision block 412, the networking device security engine 204 may perform unlocking control operations 700 that may include generating and transmitting an unlocking instruction to the actuator device 206 that causes the actuator device 206 to actuate the locking element 208 to move the locking element 208 in a direction F and from the locked orientation D into the unlocked orientation B such that the locking element 208 exits the security notch 306a defined by the chassis 302 of the networking device 300.

As can be seen in the specific example provided in FIG. 7B, the unlocking control operations 700 may cause the motor 206a to rotate the circular gear element 206b in a direction G, and the engagement of the circular gear element 206b with the gear teeth 208b on the beam 208a of the linear gear element will cause the movement of the beam 208a in the direction F and into the unlocked orientation B, and one of skill in the art in possession of the present disclosure will appreciate how the stabilizing member 208c on the linear gear element that is mounted to the locking element guide members 202b defined by the chassis 202 operates to stabilize the movement of the beam 208a in the direction F and into the unlocked orientation B.

As will be appreciated by one of skill in the art in possession of the present disclosure, the movement of the locking element 208/beam 208a out of the security notch 306a defined by the chassis 302 of the networking device 300 and into the unlocked orientation B will allow movement of the networking device 300 relative to the chassis 202, as the chassis 302 of the networking device 300 is no longer constrained between the networking device connector 210 and the locking element 208/beam 208a. As such, the networking device 300 may be removed from the networking device housing 212/chassis 202/computing device 200 via the networking device housing entrance/exit defined by the chassis 202.

As discussed above, while not described in detail herein, a second networking device locking subsystem (e.g., provided by an actuator device similar to the actuator device 206, a locking element similar to the locking element 208, etc.) may be provided opposite the networking device locking subsystem described above (e.g., the actuator device 206, the locking element 208, etc.), and may be controlled at block 414 to move its respective locking element/beam (e.g., provided by a locking element/beam similar to the locking element 208/beam 208a) out of the security notch 306b defined by the chassis 302 of the networking device 300. As such, a datacenter technician, network administrator, or other user may provide for the unlocking of the networking device 300 from the networking device locking subsystem in the chassis 202 of the computing device 200 and may then disconnect and remove the networking device 300 from the computing device 200 (e.g., via the networking device housing entrance/exit defined by the chassis 202 as discussed above) without the need to access the networking device housing 212 in the computing device 200 (e.g., with the access wall on the chassis 202 discussed above secured to the chassis 202 and without the need to unsecure that access wall from the chassis 202).

If at decision block 410 an unlocking command is not received, or if at decision block 412 the unlocking command is not verified, or following block 414, the method 400 returns to decision block 404. As such, the method 400 may loop such that the networking device security engine 204 monitors for locking commands or unlocking commands, attempts to verify those locking commands or unlocking commands when they are received, controls the networking device locking subsystem in the chassis 202 to provide it in the locked orientation when locking commands are verified, and controls the networking device locking subsystem in the chassis 202 to provide it in the unlocked orientation when unlocking commands are verified.

Thus, systems and methods have been described that provide for the securing and un-securing of a networking device in a computing device housing defined by computing device chassis without the need to physically access that computing device housing. For example, the networking device security system of the present disclosure may include a chassis housing a networking device. A locking element is movably coupled to the chassis adjacent the networking device, and an actuator device in the chassis is configured to actuate the locking element. A networking device security subsystem in the chassis receives a networking device locking command via a network, verifies security information in the networking device locking command and, in response, controls the actuator device to actuate the locking element into a locked orientation that prevents movement of the networking device relative to the chassis. Subsequently, the networking device security subsystem receives a networking device unlocking command via the network, verifies security information that is included in the networking device unlocking command and, in response, controls the actuator device to actuate the locking element into an unlocked orientation that does not prevent movement of the networking device relative to the chassis. As such, networking devices like the OCP NIC networking device described herein may be connected to and disconnected from computing devices in a secure manner without the need to "open" up a computing device chassis on the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device security system, comprising:
a computing device chassis;
a networking device that is housed in the computing device chassis;
a locking element that is movably coupled to the computing device chassis adjacent the networking device;
an actuator device that is included in the computing device chassis and that is configured to actuate the locking element; and
a networking device security subsystem that is included in the computing device chassis, that is coupled to the actuator device, and that is configured to:
receive, via a network, a networking device locking command;
verify the networking device locking command and, in response, control the actuator device to actuate the locking element into a locked orientation in which the locking element prevents movement of the networking device relative to the computing device chassis;
receive, via the network and subsequent to actuating the locking element into the locked orientation, a networking device unlocking command; and
verify the networking device unlocking command and, in response, control the actuator device to actuate the locking element into an unlocked orientation in which the locking element does not prevent movement of the networking device relative to the computing device chassis.

2. The system of claim 1, wherein the networking device is an Open Compute Project (OCP) Network Interface Controller (NIC) networking device.

3. The system of claim 1, wherein the networking device security subsystem is provided by a Baseboard Management Controller (BMC) device.

4. The system of claim 1, wherein the computing device chassis defines a plurality of locking element guide channels, and wherein the locking element is moveably coupled to the computing device chassis via the plurality of locking element guide channels.

5. The system of claim 1, wherein the computing device chassis includes an access wall that is configured to be secured to the computing device chassis to restrict access to the networking device, and wherein the computing device chassis is configured to allow the networking device to be removed from the computing device chassis with the access wall secured to the computing device chassis when the locking element is in the unlocked orientation and does not prevent movement of a networking device relative to the computing device chassis.

6. The system of claim 1, wherein the locking element includes a linear gear element, and wherein the actuator device includes a circular gear element that engages the linear gear element, and a motor that is configured to rotate the circular gear element.

7. The system of claim 1, wherein the locked orientation of the locking element positions the locking element in a securing notch that is defined by the networking device, and wherein the locking element is configured to engage the networking device adjacent the securing notch to prevent movement of the networking device relative to the computing device chassis.

8. An Information Handling System (IHS), comprising:
a chassis that defines a networking device housing;
a locking element that is movably coupled to the chassis adjacent the networking device housing;
an actuator device that is included in the chassis and that is configured to actuate the locking element;
a processing system that is included in the chassis; and
a memory system that is included in the chassis, that is coupled to the processing system, and that includes instructions that, when executed by the processing system, cause the processing system to provide a networking device security engine that is configured to:
receive, via a network, a networking device locking command;
verify the networking device locking command and, in response, control an actuator device to actuate the locking element into a locked orientation in which the locking element prevents movement of a networking device relative to the chassis when the networking device is located in the networking device housing;
receive, via the network and subsequent to actuating the locking element into the locked orientation, a networking device unlocking command; and
verify the networking device unlocking command and, in response, control the actuator device to actuate the locking element into an unlocked orientation in which the locking element does not prevent movement of a networking device relative to the chassis when the networking device is located in the networking device housing.

9. The IHS of claim 8, wherein the networking device housing is configured to house an Open Compute Project (OCP) Network Interface Controller (NIC) networking device.

10. The IHS of claim 9, wherein the processing system and the memory system are included in a Baseboard Management Controller (BMC) device that is housed in the chassis.

11. The IHS of claim 10, wherein the chassis defines a plurality of locking element guide channels, and wherein the locking element is moveably coupled to the chassis via the plurality of locking element guide channels.

12. The IHS of claim 11, wherein the chassis includes an access wall that is configured to be secured to the chassis to restrict access to the networking device housing, and wherein the chassis is configured to allow a networking device to be removed from the chassis with the access wall secured to the chassis when the locking element is in the unlocked orientation and does not prevent movement of a networking device relative to the computing device chassis when the networking device is located in the networking device housing.

13. The IHS of claim 12, wherein the locking element includes a linear gear element, and wherein the actuator device includes a circular gear element that engages the linear gear element, and a motor that is configured to rotate the circular gear element.

14. A method for securing a networking device in a computing device, comprising:
receiving, by a networking device security subsystem via a network, a networking device locking command;
verifying, by the networking device security subsystem, the networking device locking command and, in response, controlling an actuator device to actuate a locking element that is moveably coupled to a chassis into a locked orientation in which the locking element prevents movement of a networking device relative to the chassis;
receiving, by the networking device security subsystem via the network and subsequent to actuating the locking element into the locked orientation, a networking device unlocking command; and
verifying, by the networking device security subsystem, the networking device unlocking command and, in response, controlling the actuator device to actuate the locking element into an unlocked orientation in which the locking element does not prevent movement of the networking device relative to the chassis.

15. The method of claim 14, wherein the networking device is an Open Compute Project (OCP) Network Interface Controller (NIC) networking device.

16. The method of claim 14, wherein the networking device security subsystem is provided by a Baseboard Management Controller (BMC) device.

17. The method of claim 14, wherein the chassis defines a plurality of locking element guide channels, and wherein the locking element is moveably coupled to the chassis via the plurality of locking element guide channels.

18. The method of claim 14, wherein the chassis includes an access wall that is configured to be secured to the chassis to restrict access to the networking device, and wherein the chassis is configured to allow a networking device to be removed from the chassis with the access wall secured to the chassis when the locking element is in the unlocked orientation and does not prevent movement of a networking device relative to the chassis.

19. The method of claim 14, wherein the locking element includes a linear gear element, and wherein the actuator device includes a circular gear element that engages the linear gear element, and a motor that is configured to rotate the circular gear element.

20. The method of claim 14, wherein the locked orientation of the locking element positions the locking element in a securing notch that is defined by the networking device, and wherein the locking element engages the networking device adjacent the securing notch to prevent movement of the networking device relative to the computing device chassis.

* * * * *

UNITED STATES PATENT AND TRADEMARK OFFICE
CERTIFICATE OF CORRECTION

PATENT NO. : 12,488,153 B2  
APPLICATION NO. : 18/467951  
DATED : December 2, 2025  
INVENTOR(S) : Shree Rathinasamy et al.

Page 1 of 1

It is certified that error appears in the above-identified patent and that said Letters Patent is hereby corrected as shown below:

In the Claims

Column 15, Line 19, Claim 10, "The IHS of claim 9" should be changed to --The IHS of claim 8--.

Column 15, Line 23, Claim 11, "The IHS of claim 10" should be changed to --The IHS of claim 8--.

Column 15, Line 27, Claim 12, "The IHS of claim 11" should be changed to --The IHS of claim 8--.

Column 15, Line 37, Claim 13, "The IHS of claim 12" should be changed to --The IHS of claim 8--.

Signed and Sealed this  
Twenty-seventh Day of January, 2026

John A. Squires  
*Director of the United States Patent and Trademark Office*